United States Patent [19]

Takeda et al.

[11] 4,268,788
[45] May 19, 1981

[54] A.C. GENERATOR EXCITING METHOD

[75] Inventors: Masanobu Takeda, Niiza; Shigeaki Anzai, Kawagoe, both of Japan

[73] Assignee: Denyo Kabushiki Kaisha, Tokyo, Japan

[21] Appl. No.: 77,243

[22] Filed: Sep. 19, 1979

[30] Foreign Application Priority Data

Sep. 19, 1978 [JP] Japan ................................ 53/114099

[51] Int. Cl.³ ................................................. H02P 9/14
[52] U.S. Cl. ........................................ 322/59; 322/93; 310/165
[58] Field of Search ........................ 322/89, 90, 93, 94, 322/95, 96, 59; 219/133, 134; 310/165, 198

[56] References Cited

U.S. PATENT DOCUMENTS 3,714,542 1/1973 Arutjunian et al. ................. 322/93

Primary Examiner—J. V. Truhe
Assistant Examiner—John W. Redman
Attorney, Agent, or Firm—Ladas & Parry

[57] ABSTRACT

In an a.c. generating means exciting method, the exciting windings are wound on the stationary core on which the armature winding has been wound, in such a manner that the exciting windings are delta-connected to one another with the two ends open, and the zero phase current obtained from the two open ends of the delta-connected exciting windings and the phase current obtained from the exciting windings are combined and subjected to rectification to provide a direct current which is utilized to excite the field winding, whereby the field control is carried out in response to the increasing load current and the transient characteristic of the a.c. generating means is improved.

3 Claims, 5 Drawing Figures

F I G. 3
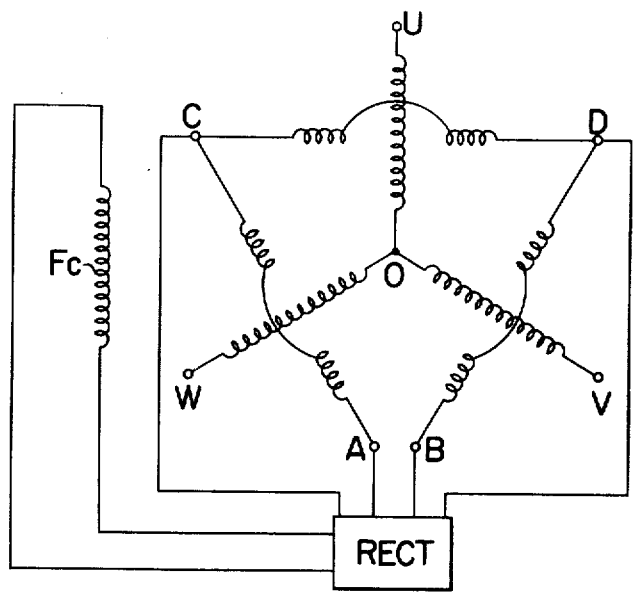
F I G. 5
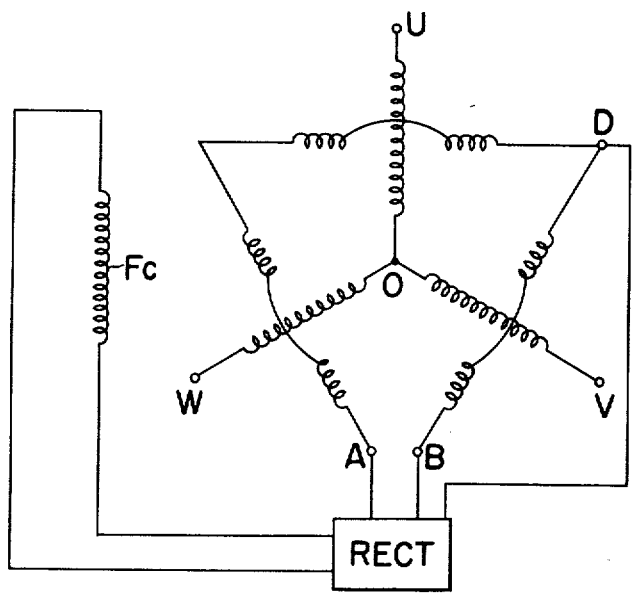

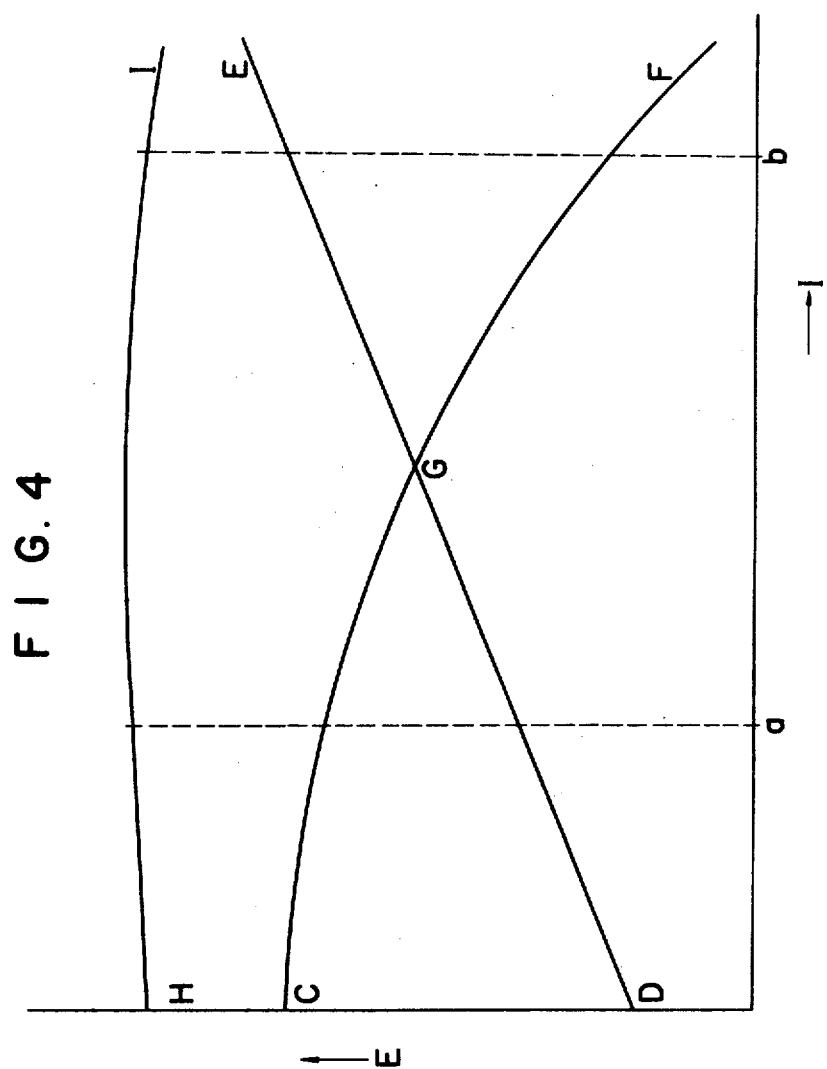

A.C. GENERATOR EXCITING METHOD

BACKGROUND OF THE INVENTION

This invention relates to a method of exciting an a.c. generating means such as an a.c. generator and an a.c. welder.

Typical conventional methods of exciting a.c. generating means, for example a.c. generators are as shown in FIGS. 1 and 2. In the method illustrated in FIG. 1, electric currents are obtained from three phase outputs U, V and W connected to an armature winding Am through a current transformer CT, and electric currents are obtained through reactors L from the three phase outputs U, V and W. These currents thus obtained are rectified by a rectifier Rect and applied to a field winding Fc.

However, the arrangement of the a.c. generator is disadvantageous in the following points: The generator is liable to become bulky and high in manufacturing cost. If the load is a pump under water, a winch, a motor-driven compressor, etc. with the generator and its exciting device designed small in size, then the transient characteristic becomes unstable, and at worst it may be impossible to supply current. In order to overcome this difficulty, it is necessary to employ an a.c. generator having a larger capacity.

In the method illustrated in FIG. 2, only a zero phase current from the open ends of a delta-connected winding is rectified by a rectifier Rect and applied to a field winding Fc. However, since it is impossible to cover the exciting current with the zero phase current only, the method involves a number of problems to be solved before it is actually practiced.

SUMMARY OF THE INVENTION

Accordingly, an object of this invention is to eliminate the above-described difficulties accompanying a conventional a.c. generator means exciting method.

Another object of the invention is to provide a method of exciting an a.c. generating means in which the field control is effected with an increasing load current thereby to improve the transient characteristic of the generator.

The foregoing objects and other objects of the invention have been achieved by the provision of a method of exciting an a.c. generating means in which the armature winding and the exciting windings for exciting the field winding are wound on one and the same core in such a manner that the exciting windings are delta-connected with two ends open, and a phase current obtained from the exciting windings and a zero phase current obtained through the two open ends of the delta-connected exciting windings are combined, rectified and applied to the field winding.

The nature, principle and utility of the invention will become more apparent from the following detailed description and the appended claims when read in conjunction with the accompanying drawings.

BRIEF DESCRIPTION OF THE DRAWINGS

In the accompanying drawings:

FIG. 3 is a connection diagram illustrating one example of a method of exciting an a.c. generator according to this invention;

FIG. 4 is a graphical representation indicating the output characteristic of the example shown in FIG. 3; and FIG. 5 is a connection diagram illustrating another example of the method according to the invention.

DETAILED DESCRIPTION OF THE INVENTION

Figure 1:
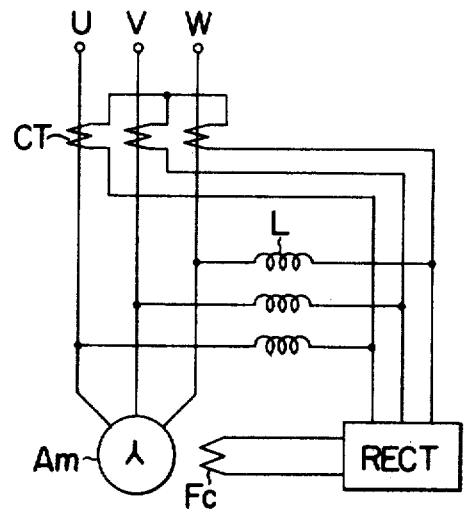
FIGS. 1 and 2 are explanatory diagrams for a description of examples of a conventional three-phase generator exciting method, respectively.
Figure 2:
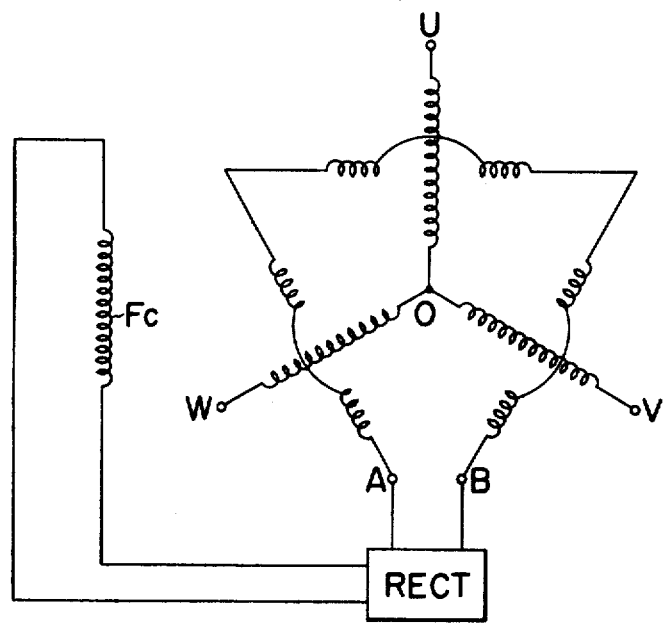

One example of a method of exciting an a.c. generating means according to this invention is as illustrated in FIG. 3. Windings U, V and W form a three-phase armature winding. Exciting windings are wound on one and the same stationary core on which the three-phase armature winding has been wound. More specifically exciting windings are coupled to one another in three-phase and series connection or in delta connection with two open ends as shown in FIG. 3. Terminals A, B, C and D are connected to the open ends, and the connection points of the exciting windings, respectively. These four terminals are connected to a rectifier Rect, the rectification output of which is applied to the field winding of the rotor.

The current applied to the field winding is the combination of the fundamental wave component and the zero phase current component. In other words, the fundamental wave component is obtained from the windings corresponding to so-called phase windings, and the zero phase current component having the third harmonic as its main component is obtained through the open ends of the series-connected windings. The zero phase component increases when the load current increases. Accordingly, employment of the zero phase component for field control makes it possible to increase the field current in response to the increasing load current.

The excitation characteristic of the example shown in FIG. 3 is as indicated in FIG. 4. The excitation characteristic is as indicated by the curve CGF at the time of excitation with the fundamental wave component only, and it is as indicated by the curve DGE at the time of excitation with the zero phase component only. Accordingly, when the excitation is carried out with the current which is obtained by combining the fundamental wave component and the zero phase component, then the excitation characteristic is as indicated by the curve HI. In the latter case, the excitation characteristic is a substantially constant voltage excitation characteristic with respect to the variations of the load current I, and the output voltage is proportionally of a constant voltage output characteristic in a wide range with respect to the variations of the load current. Thus, the characteristic is remarkably improved. In FIG. 4, reference character a designates the rated current value; b, the motor starting current value; E, the voltage applied to the field winding; and I, the load current.

Another example of the method of the invention is illustrated in FIG. 5. In this method, the fundamental wave component is used as much as necessary; that is, the fundamental wave component from only one winding is used to be combined with the zero phase current component. Accordingly, only three terminals A, B and D are connected to the rectifier Rect.

In the above-described two examples, the outputs of the exciting windings are applied through the rectifier to the field winding; however, the rectifier may be replaced by an automatic voltage regulator.

It should be noted that the term "a.c. generating means" includes a generator and a welder.

In the above-described examples, the arrangement of the various windings has not been described in detail. However, the best relation between the armature winding and the exciting winding can be obtained by arranging them in such a manner that the exciting winding Ex is shifted by 90° from the armature winding. That is, in this arrangement, the maximum output can be obtained.

As is apparent from the above description, according to the invention, the armature winding and the exciting windings are wound on one and the same stationary core in such a manner that the exciting windings are series-connected to one another, whereby the zero phase current including the third harmonic is applied through the rectifier to the field winding. Accordingly, the field control can be carried out in response to the increasing load current. Thus, an alternating current generating means excellent in transient characteristic can be provided according to the invention.

What is claimed is:

1. A method of exciting an alternating current generating means is which an armature winding and exciting windings are wound on one and the same core in such a manner that said exciting windings are series-connected in the form of delta connection with two ends open, and a zero phase current obtained through said two open ends of said exciting windings in the form of delta connection and a phase current obtained from said exciting windings by utilizing at least one of the delta connection points of said exciting windings are combined and rectified to provide a direct current which is employed to excite said field winding.

2. A method as claimed in claim 1, in which said zero phase current and said phase current are obtained from said exciting winding which is shifted by an angle of substantially 90 degrees from said armature winding.

3. A method as claimed in claim 1, in which said zero phase current and said phase current are applied to an automatic voltage regulator to provide a direct current which is employed to excite said field winding.

* * * * *